United States Patent [19]

Nomura et al.

[11] Patent Number: 5,739,934
[45] Date of Patent: Apr. 14, 1998

[54] WAVELENGTH DIVISION MULTIPLEXING LIGHTWAVE TRANSMISSION SYSTEM

[75] Inventors: Kenichi Nomura; Takaaki Ogata, both of Tokyo, Japan

[73] Assignee: NEC Corporation, Tokyo, Japan

[21] Appl. No.: 695,853

[22] Filed: Aug. 9, 1996

[30] Foreign Application Priority Data

Aug. 9, 1995 [JP] Japan .................................. 7-202647

[51] Int. Cl.⁶ ............................................. H04J 14/02
[52] U.S. Cl. .......................... 359/124; 359/123; 359/133; 370/474
[58] Field of Search ................................. 359/123–124, 359/133, 127, 135, 173; 370/349, 431, 474, 491

[56] References Cited

U.S. PATENT DOCUMENTS 5,610,913  3/1997  Tomonaga et al. .................. 370/219

*Primary Examiner*—Kinfe-Michael Negash
*Attorney, Agent, or Firm*—Scully, Scott, Murphy & Presser

[57] ABSTRACT

It is the objects of the invention to increase the degree of freedom of channel selecting and to decrease kinds of elemental hardwares. In a transmitter, the wavelengths of lightwaves of respective channels are different from each other by the aids of wavelength control units, and channel IDs are inserted as the overhead signals of respective channels by channel marker generating units, before the electrical signals are converted into lightwave signals. In the receiver, in order to obtain a desired channel from WDM channels, wavelength tunable filters are swept by filter control circuit, and filters, which receives lightwave signals, are found. Then, the channel ID is extracted from the overhead signal of the transmission frame in the state of an electrical signal. The channel ID thus obtained is compared with an exact and desired ID by a channel ID comparison unit. If the two aforementioned IDs do not coincide, the above mentioned operations, involving sweeps of the wavelength tunable filters, are repeated.

7 Claims, 5 Drawing Sheets

WAVELENGTH DIVISION MULTIPLEXING LIGHTWAVE TRANSMISSION SYSTEM

FIELD OF THE INVENTION

The invention relates to a wavelength division multiplexing lightwave transmission system, and especially to channel selecting means in the wavelength division multiplexing lightwave transmission system.

BACKGROUND OF THE INVENTION

Nowadays, investigations into wavelength division multiplexing (WDM, hereinafter) lightwave transmission technologies are being earnestly made by engineers in the field of a lightwave communication, in order to obtain a communication system with high capacity. In the WDM lightwave transmission system, the capacity of the lightwave transmission system can be increased by providing the system with plural light sources with different wavelengths, and this system is promising and expected to be realized in near future.

However, following disadvantages are pointed out on conventionally proposed WMD lightwave transmission systems. If the number of channels of the WMD transmission system is n, n kinds of elemental hardwares, such as E/O and O/E converters, wavelength control units for E/O converters, and wavelength filters, must be provided for the WMD lightwave transmission systems. Moreover, if the characteristics of E/O converters are fluctuated in a transmitter, received signal levels will be decreased in a receiver. Accordingly, the cost of the system will be increased, and adjustments thereof will be complicated.

SUMMARY OF THE INVENTION

Accordingly, it is an object of the invention to provide a WDM lightwave transmission system, in which the n channels of the WDM lightwaves can be transmitted and received simultaneously by using only one kind of elemental hardwares for each function of the system, and necessity to provide n kinds of elemental hardwares for the system in accordance with the number of the channels can be eliminated.

It is a further object of the invention to provide a WDM lightwave transmission system, in which the level of the received signal is not decreased, even when the wavelength of the transmitted lightwave signal is fluctuated.

According to the first feature of the invention, the WDM lightwave transmission system comprises:

a transmitter, comprising:
  transmission frame-generating means, which respectively add channel identifying information signals to main signals to be transmitted,
  electrical to optical signal converting units, which respectively convert the transmission frames into lightwave signals with different wavelengths, and
  lightwave signal-multiplexing means, which multiplexes the lightwave signals and supplies them to a lightwave transmission line.

According to the second feature of the invention, the WDM lightwave transmission system comprises:

a transmitter, comprising:
  transmission frame-generating means, which respectively add channel identifying marker signals to main signals to be transmitted,
  electrical to optical signal converting units, which respectively convert the transmission frames into lightwave signals with different wavelengths, and
  lightwave signal-multiplexing means, which multiplexes the lightwave signals to be supplied to a lightwave transmission line; and a receiver, comprising:
  lightwave-demultiplexing means, which receives and demultiplexes the WDM lightwaves transmitted from the transmitter,
  lightwave filter means, which are respectively supplied with demultiplexed lightwave signals and respectively have tunable wavelength-selecting characteristics in accordance with control signals,
  channel-identifying marker signals-extracting means, which respectively convert the lightwave signals supplied from the lightwave filter means into electrical signals and extract the channel identifying marker signals from the transmission frames,
  comparison units, which respectively compare the extracted channel-identifying marker signals with predetermined channel identifying marker signals,
  received signal levels detecting means which respectively detect signal levels of output lightwaves of the filter means, and control means, which respectively sweep and control the wavelength selecting characteristics of the lightwave filter means in accordance with the detected signal levels of the received signal detecting means and output signals of the comparison units corresponding to results of comparisons.

The operation of the invention can be summarized as follows. In the transmitter, the main signals are respectively provided with channel IDs, which identify themselves, converted into the lightwave signals with different wavelengths, each of which corresponds to the aforementioned channels, and multiplexed to be transmitted. In the receiver, the received lightwave signals are demultiplexed by a demultiplexer and supplied to wavelength tunable filters, where the wavelength-selecting characteristic of each wavelength tunable filter is swept and controlled, and the channel ID of the received signal is compared with a prescribed ID. If the former coincides with the latter, the characteristic of the wavelength tunable filter is so trimmed (finely adjusted) that the level of the received signal becomes maximum. If the former does not coincide with the latter, the aforementioned operation of sweep and control of the wavelength tunable filter is repeated till the former coincides with the latter.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a WDM lightwave transmission system in the preferred embodiments according to the invention, the aforementioned conventional WDM lightwave transmission system will be explained referring to FIG. 1.

Figure 1:
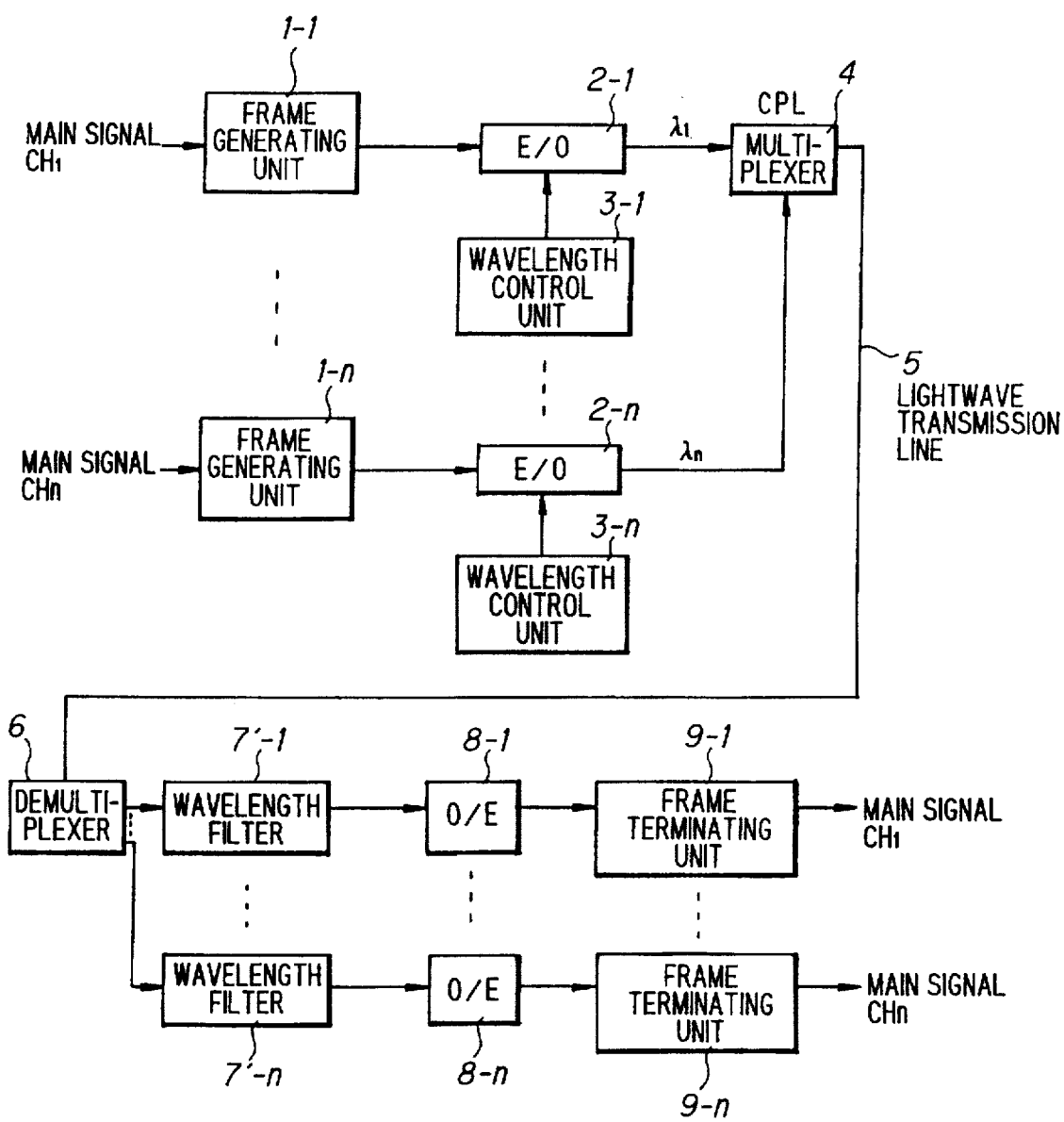
FIG. 1 shows a block diagram of a conventional WDM transmission system.

FIG. 1 shows the outline of the structure of the conventional WDM lightwave transmission system. In a transmitter, main signals to be transmitted are assigned to plural main channels CH1 to CHn, and these main signals are respectively processed into transmission frame signal in frame generating circuits 1-1 to 1-n, to be supplied to E/O (electrical/optical) converters 2-1 to 2-n. In the E/O converters 2-1 to 2-n, the transmission frame signals are so converted into lightwave signals from electrical signals that the lightwave signals have different wavelengths $\lambda 1$ to $\lambda n$ by the aid of wavelength control units 3-1 to 3-n in accordance with lasing temperature, and the wavelength of each lightwave is established.

These lightwave signals are multiplexed by a multiplexer 4, which is composed of lightwave couplers, and supplied to a lightwave transmission line 5.

In a receiver, the lightwave signals, which are transmitted through the lightwave transmission line 5, are demultiplexed by a demultiplexer 6, which is composed of lightwave couplers, and respectively supplied to wavelength filters 7'-1 to 7'-n, through which only lightwaves with specific wavelengths can transmit.

The lightwave signals, which have transmitted through the wavelength filters 7'-1 to 7'-n, are respectively supplied to O/E converters 8-1 to 8-n, and converted into electrical signals. The electrical signals thus obtained are respectively terminated by frame-terminating circuits 9-1 to 9-n, and finally derived as main signals of the respective channels.

In the conventional WDM system shown in FIG. 1, the system must be provided with the wavelength control unit 3-1 to 3-n and the E/O converters 2-1 to 2-n, which respectively correspond to the wavelengths $\lambda 1$ to $\lambda n$ of the transmitted lightwaves in the respective channels. The wavelengths of the lightwaves of the respective channels are determined by the Wavelength control circuits and the E/O converter. For example, since the wavelength of each lightwave is determined by a temperature of a laser, which serves as a signal source, the system is under a great disadvantage that n kinds of wavelength control circuits and E/O converters must be provided.

Moreover, the receiver also must be provided with n kinds of the wavelength filters 7'-1 to 7'-n, which have such lightwave-selecting characteristics that only the lightwaves with the wavelengths of $\lambda 1$ to $\lambda n$ can transmit.

Furthermore, since the characteristics of the wavelength filters in the receiver are fixed, the received signal levels of the O/E converters 8-1 to 8-n in the receiver will be decreased, when the wavelengths of the transmitting lightwaves are fluctuated.

Hereafter, a preferred embodiment according to the invention will be explained referring to the appended drawings.

Figure 2:
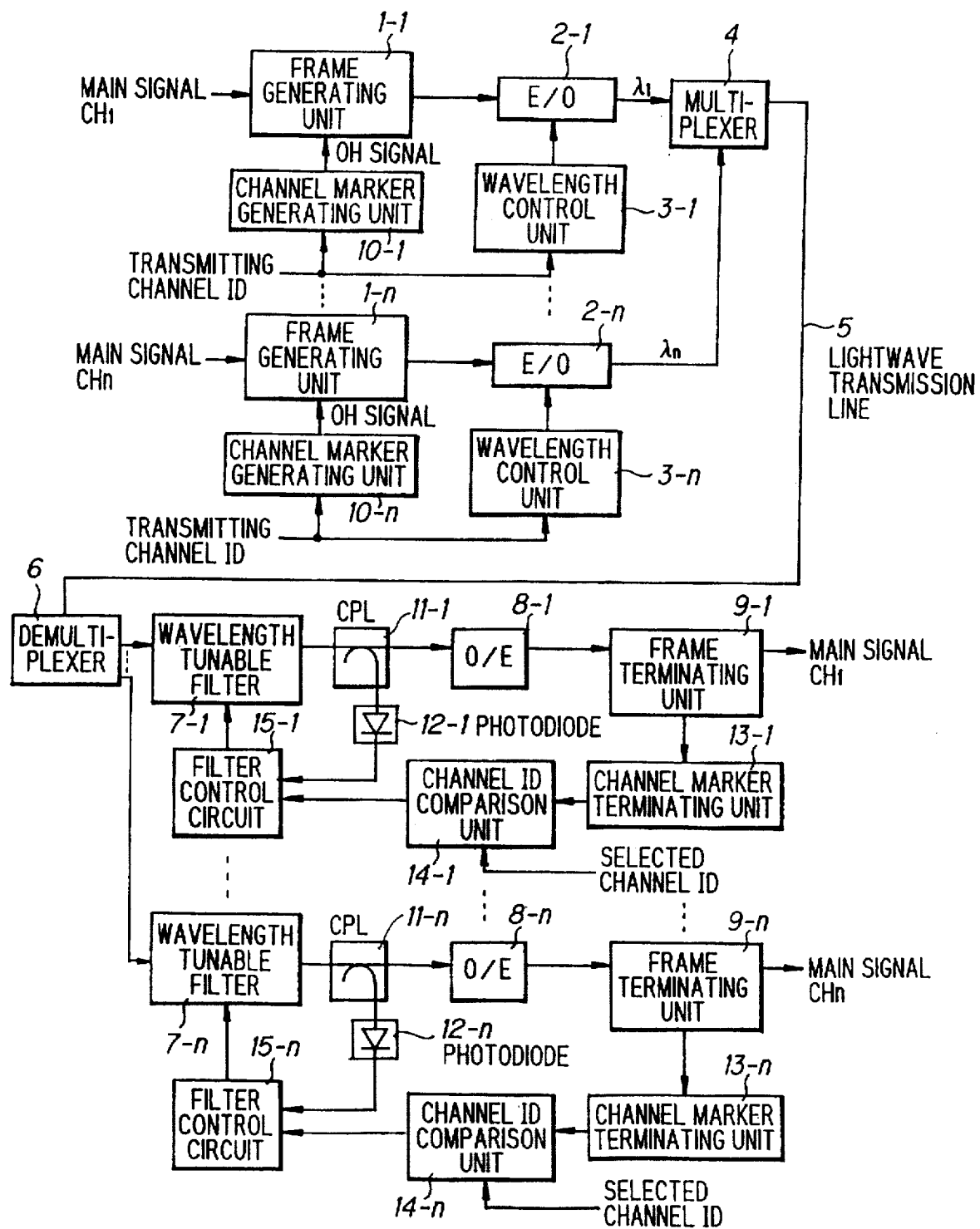
FIG. 2 shows a block diagram of a WDM transmission system in a preferred embodiment according to the invention.

FIG. 2 shows a system block diagram of the preferred embodiment of the invention. Circuit elements, which have the same functions as those shown in FIG. 1, are represented by the same reference numerals. In the transmitter shown in FIG. 2, main signals CH1 to CHn are processed into transmission frames by the frame generating units 1-1 to 1-n, converted into lightwave signals by E/O converters 2-1 to 2-n, multiplexed by a multiplexer 4, and transmitted through a lightwave transmission line 5.

The IDs (channel-identifying signals) of the transmission channels are previously generated on the outside of the transmitter, and respectively converted into channel marker signals (channel-identifying marker signals) in channel marker-generating units 10-1 to 10-n, to be supplied to frame-generating units 1-1 to 1-n. In the frame-generating units 1-1 to 1-n, the channel marker signals are respectively inserted into the transmission frames as their OH (over head) signals.

The channels IDs are also supplied to wavelength control units 3-1 to 3-n, to be converted into wavelength control signals for the lightwaves, and thereby the wavelengths of the output lightwaves of E/O converters 2-1 to 2-n are respectively controlled. When the lightwave generator of the E/O converter is a laser, the wavelength of the lightwave can be controlled by changing the temperature of the laser.

In the receiver, the WDM lightwave signals, which are transmitted through the lightwave transmission line 5, are demultiplexed by a demultiplexer 6, which is composed of optical couplers, to be respectively supplied to wavelength tunable filters 7-1 to 7-n. The output lightwaves of the wavelength tunable filters 7-1 to 7-n are respectively branched into pairs of lightwaves by optical couplers 11-1 to 11-n, where ones are respectively converted into electrical signals to be supplied to filter control circuits 15-1 to 15-n by photodiodes 12-1 to 12-n.

The other ones are respectively supplied to O/E converters 8-1 to 8-n to be converted into electrical signals, and terminated by frame terminating units 9-1 to 9-n, where OH signals are separated and respectively supplied to channel marker-terminating units 13-1 to 13-n.

Channel marker signals, which are extracted by the channel marker-terminating units 13-1 to 13-n, are respectively compared with selected channel IDs, which have been previously supplied from the outside of the receiver, in channel ID comparison units 14-1 to 14-n. The results of the comparisons are respectively supplied to the filter control circuits 15-1 to 15-n.

Figure 3:
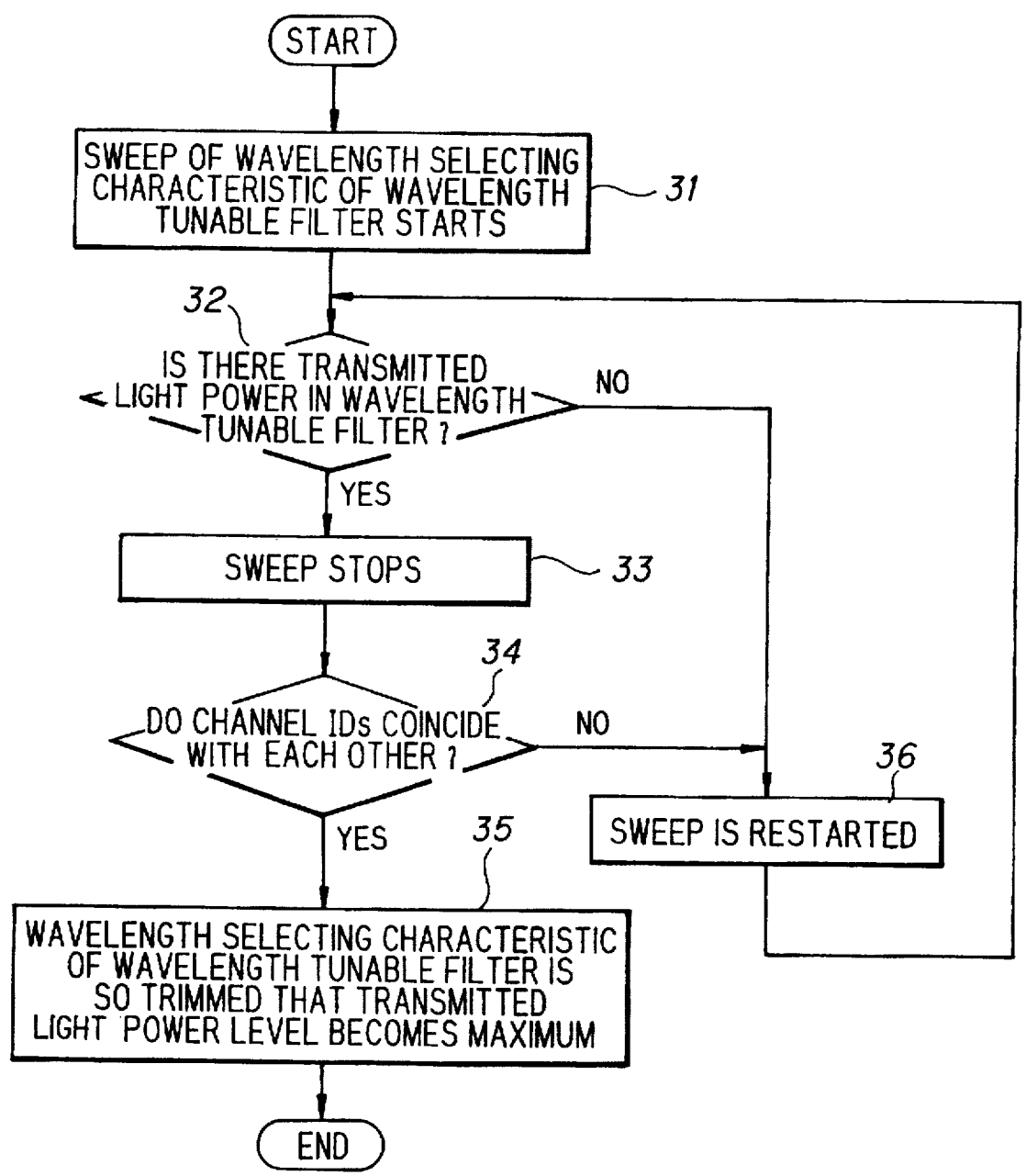
FIG. 3 is a flow chart of the operation of a filter control circuit, used in a system shown in FIG. 2.
Figure 4:
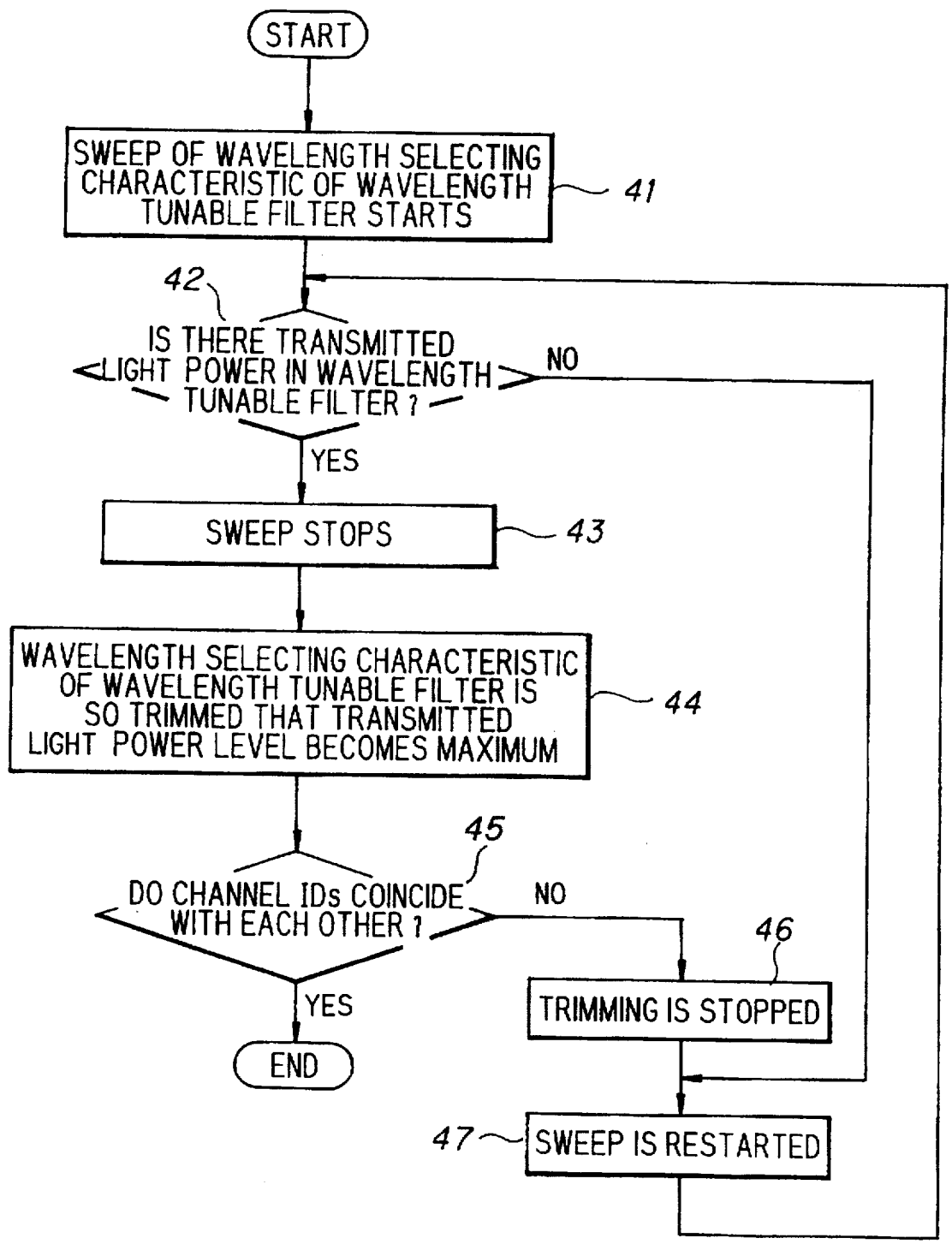
FIG. 4 is a flow chart of the operation of a filter control circuit, used in a system shown in FIG. 2.
Figure 5:
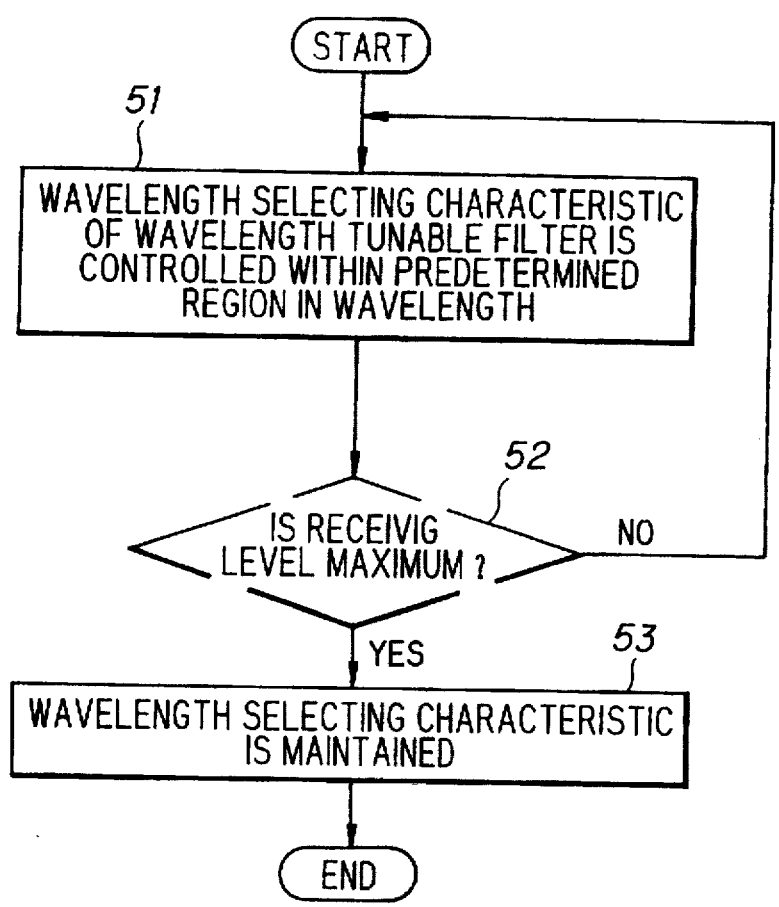
FIG. 5 is a flow chart of the operation of a filter control circuit, used in a system shown in FIG. 2.

The filter control circuits 15-1 to 15-n continuously control the wavelength selecting characteristics of the wavelength tunable filters 7-1 to 7-n, and operate in accordance with flow charts shown in FIG. 3 to FIG. 5.

On referring to FIG. 3, it can be seen that, first, the sweeps of the wavelength-selecting characteristics of the wavelength tunable filters 7-1 to 7-n are started (step 31). During these sweeps, the received signal levels of the photodiodes 12-1 to 12-n are monitored (step 32), and if received signals are detected (if transmitted light powers of wavelength tunable filters are detected), the sweeps are stopped leaving the circuits untouched (33).

The output signals of the channel comparison units 14-1 to 14-n are monitored to see whether the coincidence signals are generated (step 34). If the coincidence signals are detected, the wavelength selecting characteristics of the wavelength tunable filters 7-1 to 7-n are so trimmed that the received signal levels become maximum (step 35).

If the transmitted light powers of the wavelength tunable filters are not detected (step 36), the sweeps of the wavelength-selecting characteristics are repeated till the transmitted light powers are detected.

FIG. 4 shows another flow chart for controlling the filter control circuit 15-$i$, where $i$ is any integer belonging to a series 1, 2, 3 - - - n. After the sweep of the wavelength-selecting characteristic of the filter control circuit 15-$i$ is started (step 41), the transmitted light power of the wavelength tunable filter 7-$i$ is monitored (step 42).

If the transmitted light power is detected at that time, the sweep is stopped (step 43), and the wavelength tunable filter 7-$i$ is so trimmed that the aforementioned transmitted light power becomes maximum (step 44). Thereafter, the result of the comparison between the channel IDs is examined (step 45).

If the channel IDs coincides with each other, the sweep is stopped, and the wavelength-selecting characteristic of the wavelength tunable filter 7-$i$ keeps the maximum receiving level, which is established by the trimming thereof (step 44).

If the channel IDs disagree with each other, the trimming is stopped (step 46) and the sweep of the wavelength-selecting characteristic is restarted (step 47), and the flow returns to the step 42, and the same procedure is repeated till the channel IDs coincide with each other.

FIG. 5 shows a flow chart of trimming the wavelength tunable filter 7-$i$, which correspond to the step 35 in FIG. 3 and the step 44 in FIG. 4. The wavelength-selecting characteristic of the wavelength tunable filter 7-$i$ is swept and controlled within a small predetermined region ($\lambda \pm \Delta\lambda$) (step 51), till the received sinal level becomes maximum (step 52). The wavelength-selecting characteristic, in which the received signal level becomes maximum, is kept up (step 53).

Moreover, in case of ordinary receiving, the filter control circuits 15-1 to 15-n may always monitor whether the received signal levels are maximum, and if the deviations of the wavelengths of the transmitting lightwaves off the optimum wavelengths of the wavelength tunable filters are found, the aforementioned deviations can be compensated by the step of trimmings shown in FIG. 5, and the maximum levels of the received signal always can be obtained. As mentioned in the above, the effects of the invention can be summarized as follows.

The lightwave transmission system according to the invention sufficiently fulfills its functions by using only one kind of the wavelength control units and the E/O converting units in the transmitter, and the wavelength tunable filters, etc. in the receiver, and the system can be manufactured at low cost.

Moreover, since the channel of the received signal is confirmed by detecting the channel marker derived from the received signal, which is obtained by sweeping the characteristic of the wavelength tunable filter, the signal of the correct channel can be received, even if the accuracies of the selected wavelength of the filter and the filter control signal are poor.

Furthermore, by tracking the wavelength of the received lightwave of the wavelength tunable filter after the signal of the correct channel is received, the correct receiving can be kept out, even when the wavelength of the transmitted lightwave is fluctuated.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A WDM lightwave transmission system, comprising:
   a transmitter, comprising:
      transmission frame-generating means, which respectively add channel-identifying marker signals to main signal to be transmitted,
      electrical to optical signal converting units, which respectively convert said transmission frames into lightwave signals with different wavelengths, and
      lightwave signals multiplexing means, which multiplexes said lightwave signals to be supplied to a lightwave transmission line; and
   a receiver which receives and demultiplexes said multiplexed lightwave signals transmitted from said transmitter to form demultiplexed lightwave signals, filters said demultiplexed lightwave signals using lightwave filter means having tunable wavelength-selecting characteristics to form filtered lightwave signals, converts said filtered lightwave signals into electrical signals, and extracts said channel-identifying marker signals from said transmission frames, said receiver including:
      comparison units, which compare said extracted channel-identifying marker signals with predetermined channel-identifying marker signals and output compared signals,
      received signal level-detecting means which detect signal levels of said filtered lightwave signals, wherein said received signal level-detecting means outputs detected signal levels, and
      control means, which respectively sweep and control said tunable wavelength-selecting characteristics in response to said detected signal levels and said compared signals.

2. A WDM-lightwave transmission system, comprising:
   a transmitter, comprising:
      transmission frame-generating means, which respectively add channel-identifying marker signals to main signals to be transmitted,
      electrical to optical signal converting units, which respectively convert said transmission frames into lightwave signals with different wavelengths, and
      lightwave signals multiplexing means, which multiplexes said lightwave signals to be supplied to a lightwave transmission line; and
   a receiver comprising:
      a lightwave-demultiplexing means, which demultiplexes said WDM lightwaves transmitted from said transmitter,
      lightwave filter means, which are respectively supplied with demultiplexed lightwave signals and respectively have tunable wavelength-selecting characteristics in accordance with control signals,
      channel-identifying marker signals-extracting means, which respectively convert said lightwave signals supplied from said lightwave filter means into electrical signals and extract said channel-identifying marker signals from said transmission frames,
      comparison units, which respectively compare said extracted channel-identifying marker signals with predetermined channel-identifying marker signals,
      received signal level-detecting means which respectively detect signal levels of output lightwaves of said filter means, and
      control means, which respectively sweep and control said wavelength-selecting characteristics of said lightwave filter means in accordance with detected signal levels of said received signal-detecting means and output signals of said comparison units corresponding to results of comparisons.

3. A WDM lightwave transmission system according to claim 2, wherein:
   said control means respectively comprises;
      means for sweeping and controlling said wavelength-selecting characteristics of said lightwave filter means in sequence, and
   means for so trimming said wavelength-selecting characteristics of said lightwave filter means that said detected signal levels of said received signal level-detecting means respectively become maximum, when said received signal level-detecting means detect said signal levels of said output lightwaves of said filter means, while sweeping and controlling said wavelength-selecting characteristics of said filter means are carried out, sweeping and controlling said wavelength selecting characteristics of said filter means are stopped, and said comparison units generate signals corresponding to coincidences of said extracted and predetermined channel-identifying marker signals supplied thereto.

4. A WDM lightwave transmission system according to claim 3, wherein:

said control means are so constructed that, if said comparison units generate signals of non-coincidences said control means continue sweeping and controlling said wavelength-selecting characteristics of said lightwave filter means till said comparison units generate signals of coincidences of said channel-identifying marker signals supplied thereto.

5. A WDM lightwave transmission system according to claim 2, wherein:

said control means respectively comprises:
means for sweeping and controlling said wavelength-selecting characteristics of said filter means in sequence and,
means for so trimming said wavelength-selecting characteristics of said filter means that said detected signal levels of said received signal level-detecting means respectively become maximum, after sweeping and controlling said wavelength-selecting characteristics of said filter means are stopped, when said received signal level-detecting means detect said signal levels of said output lightwaves of said filter means, and
means for maintaining said wavelength-selecting characteristics of said filter means thereafter, if said comparison units generate signals of coincidences of said channel-identifying marker signals supplied thereto.

6. A WDM lightwave transmission system according to claim 5, wherein:

said control means are so constructed that, when said comparison units generate signals of non-coincidences, said wavelength-selecting characteristics of said filter means are further swept, controlled and trimmed repeatedly, till said comparison units generate said signals of coincidences of said channel-identifying marker signals supplied thereto.

7. A WDM lightwave transmission system according to claim 2, wherein:

said electrical to lightwave signal converting means in said transmitter respectively comprise means for setting and controlling said wavelengths of said lightwaves in accordance with said channel-identifying marker signals.

* * * * *